United States Patent [19]

Tago et al.

[11] 4,146,690
[45] Mar. 27, 1979

[54] METHOD OF PRODUCING PARTIALLY HYDROLYZED ACRYLAMIDE POLYMERS

[75] Inventors: Atsuo Tago; Hiroyuki Kudomi; Yasuyuki Nakanishi, all of Kita-Kyusyu, Japan

[73] Assignees: Mitsubishi Chemical Industries, Ltd.; Kyoritsu Yuki Co., Ltd., both of Tokyo, Japan

[21] Appl. No.: 811,287

[22] Filed: Jun. 29, 1977

[30] Foreign Application Priority Data

Jul. 5, 1976 [JP] Japan .................................. 51-79662

[51] Int. Cl.² .............................................. C08F 8/12
[52] U.S. Cl. .................................. 526/47.9; 526/47.7; 526/62; 526/303; 528/502
[58] Field of Search .................. 526/47, 62, 47.7, 47.9; 528/502

[56] References Cited

U.S. PATENT DOCUMENTS

| 2,886,558 | 5/1959 | Friedlander | 526/47 |
| 3,663,518 | 5/1972 | Patzelt et al. | 526/62 |
| 3,784,597 | 1/1974 | Fujimoto et al. | 260/80.3 W |
| 3,951,600 | 4/1976 | Asano et al. | 526/62 |

Primary Examiner—William F. Hamrock
Attorney, Agent, or Firm—Oblon, Fisher, Spivak, McClelland & Maier

[57] ABSTRACT

Acrylamide polymers or copolymers are partially hydrolyzed by mixing the particles of hydrous gel of the polymer in an apparatus which has a mixing mechanism comprising of blades having a blank space and the face of the apparatus where the polymer is contacted with is made of or coated with synthetic resin.

8 Claims, 6 Drawing Figures

METHOD OF PRODUCING PARTIALLY HYDROLYZED ACRYLAMIDE POLYMERS

BACKGROUND OF THE INVENTION

1. FIELD OF THE INVENTION

This invention relates to a method of producing the partially hydrolyzed acrylamide polymers, and more particularly it relates to a method of producing the partially hydrolyzed solid-state acrylamide polymers in an industrially advantageous way from a highly viscous hydrous acrylamide polymer gel obtained by polymerization in an aqueous medium. The term "acrylamide polymers" used in this specification is to be understood as signifying both homopolymers of acrylamide and copolymers containing acrylamide.

2. DESCRIPTION OF PRIOR ART

The partially hydrolyzed acrylamide polymers are generally used as flocculant, paper strengthening agent and for various other purposes. The partially hydrolyzed acrylamide polymers are produced usually by treating an acrylamide polymer with an alkaline material such as for example caustic soda to hydrolyze the amide groups. Acrylamide polymers are usually produced by polymerizing the monomer in a 10 to 35 wt% aqueous solution, but as the acrylamide polymers thus obtained are in the form of a hard hydrous rubber-like gel, no uniform contact of such gel with an alkaline material is obtained when mixing them by a common method, and hence it is hardly possible with such method to accomplish uniform hydrolysis of a desired degree. As a means for hydrolyzing such hydrous polymer gel, there has been proposed a method of kneading the gel and an alkaline material by using a rotary screw extruder (Japanese Patent Publication No. 17668/1974). This method is capable of accomplishing hydrolysis steadily and uniformly, with no risk of causing local hydrolysis, but it has a serious drawback that there could occur shear degradation of molecular weight or quality deterioration of the polymer owing to the strong shearing force that develops in the presence of an alkaline material, resulting in the reduced commercial value of the products.

The present inventors have applied themselves to the study aimed at overcoming such problems and found out that it is possible to accomplish hydrolysis of a desired degree, without causing any deterioration of the polymer quality or local hydrolysis, if the gel used for the hydrolysis is previously pulverized into particles and then mixed with an alkaline material by using a specific apparatus, and that the hydrolysis can be advanced favorably by subjecting the mixture to drying under heating immediately following the above-said operation. This invention was attained on the basis of such findings.

SUMMARY OF THE INVENTION

The gist of this invention, therefore, resides in a method of producing the partially hydrolyzed acrylamide polymers characterized in that the finely divided particles of acrylamide polymers with water content of about 65 to 90 weight % are mixed with an alkaline material under agitation in an apparatus equipped with an mixing mechanism comprising blades or flights having blank space such as ribbon blades (or flights) or a modification thereof, said apparatus being made of or coated with a synthetic resin at its surface contacted with said particles. It is also contemplated in this invention to provide a method of producing the partially hydrolyzed solid-state acrylamide polymers characterized in that the mixture of the acrylamide polymers and an alkaline material is mixed in the above-mentioned apparatus and then dried under heating.

BRIEF DESCRIPTION OF THE DRAWINGS

The accompanying drawings, which are referred to in the following description of the invention, illustrate various forms of agitating blade constituting the mixing mechanism in the mixing apparatus used in practicing the method of this invention, and in the drawings.

DETAILED DESCRIPTION OF THE INVENTION

Figure 1:
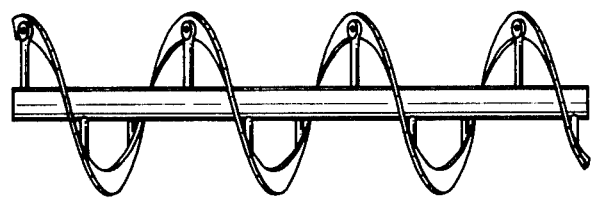
FIGS. 1 to 3 show examples of the ribbon blade.

The acrylamide polymers used in the method of this invention are principally the homopolymers of acrylamide, but it is also possible to use the copolymers of acrylamide with copolymerizable monomers. Among the copolymerizable monomers for use in this invention are, for example, acrylic acid, methacrylic acid, sodium acrylate, vinyl acetate, acrylonitrile, acrylic acid esters, methacrylic acid esters, dimethylaminoethyl acrylate, dimethylaminoethyl methacrylate and its quaternary ammonium salts, and these co-monomers, although varying depending on the kind, are usually contained in an amount of less than 70 mol %, preferably less than 50 mol %, in the copolymer. The molecular weight of the polymers usable in this invention may range from 200,000 to 10,000,000 or even higher.

The acrylamide polymers for use in this invention may be produced according to the known methods. For instance, the monomer in an aqueous solution of 10 to 35 weight %, preferably 20 to 30 weight %, is polymerized by using a known polymerization initiator. The polymerization initiator used for such purpose may be, for instance, a peroxide such as potassium persulfate or ammonium persulfate, an azo compound such as azobisisobutyronitrile, azobis(2-amidinopropane) hydrochloride, or a so-called redox system catalyst composed of a peroxide and a reducing component. Such initiators may be used in combination. The polymerization is usually carried out at a temperature ranging from about $-10°$ C. to $100°$ C.

The acrylamide polymers thus obtained are in the form of a rubber-like gel with water content of 65 to 90 weight %, preferably 70 to 80 weight %. For use in this invention, such polymer gel needs to be cut according to a known method or finely divided by a screw extruder or other means. For fine dividing there may be used an extruder for a rubber or thermoplastic resin, or a mincing machine or like means. It is most preferred to use a mincing machine such as used in Example 1 of this invention or the like devices. As the fine dividing is performed for the purpose of attaining uniform contact with the alkaline material, particles are preferable as fine as possible. But, it is impractical to divide the polymer into an excessively small size as such work requires a great deal of labour. It suffices in this invention to break the polymer gel into the particle size of less than 10 mm, especially it is desirable that the particle size is within the range of 1 to 8 mm, most preferably 2 to 5 mm. The shape of the particles needn't be spherical; they may be of any form, such as cylindrical or cubic. Although a shearing force is exerted to the polymer during such fine dividing operation, the shear degradation or quality deterioration of the polymer is eittle because of the absence of the alkaline material.

The alkaline material used as hydrolyzing agent in this invention may be the one which is normally used for hydrolysis of acrylamide polymers, such as for example caustic soda, caustic potassium, sodium carbonate or potassium carbonate, of which caustic soda is most generally used. The quantity of such alkaline material may be equivalent to or in slightly excess of the amount of the amide groups to be hydrolyzed. Also, the alkaline material may be used in any form provided that satisfactory mixing can be attained. Usually, it is used as an aqueous solution.

According to the method of this invention, the finely divided particles of an acrylamide polymer and an alkaline material are mixed in an apparatus equipped with a mixing mechanism comprising blades or flights which have blank space such as ribbon blade (flight) or modifications thereof, said apparatus being made of or coated with a synthetic resin at least at its surface contacted with said polymer particles.

Figure 2:
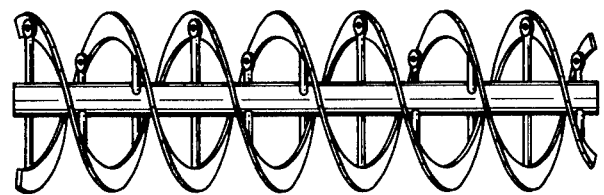
Figure 3:
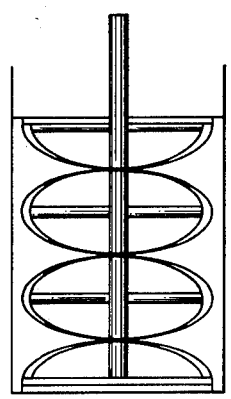
Figure 4A:
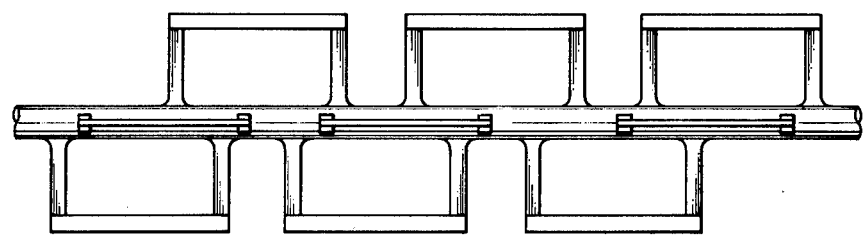
FIG. 4 shows a modification of the ribbon blade, with
(a) showing a side view and (b) showing a front view.
Figure 4B:
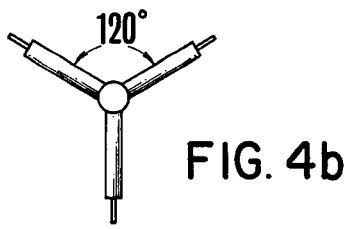
Figure 5:
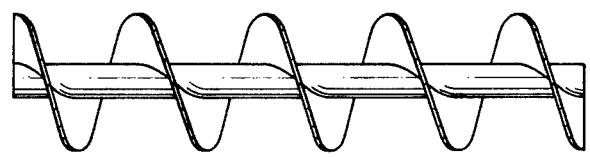
FIG. 5 shows a screw used in an ordinary screw conveyor or mixer.

The ribbon type blade used in the method of this invention may be, for example, a single helical ribbon such as shown in FIG. 1 or a double helical ribbon assembly such as shown in FIG. 2, or blades those known in the art as shown in FIG. 5 on page 546 of Handbook of Chemical Apparatus Designing (published Nov. 20, 1960, by Maruzen Co.), an example of modification of ribbon blade is a type having gate shape blade connected to the shaft as shown in FIG. 4 or the like. For convenience sake, ribbon blade or flight and its modifications mentioned above are called ribbon or ribbon blade in the specification. It is desirable that the shaft to which the ribbon is connected is set horizontally, but it may be set vertically as shown in FIG. 3. The apparatus equipped with such mixing mechanism may be, for example, a screw conveyor having a ribbon blade (or blades) or its modification, or a vertical or horizontal ribbon blender (or mixer) (such as shown on pages 377 and 467 of "Encyclopedia of Chemical Apparatus" published July 1, 1971, by Kagaku Kogyosha). It is to be noted however that the screw of the type shown in FIG. 5 is not usable in the present invention for the following reason. In the case of such screw, since there is no blank space in the blade, the particles are apt to adhere to each other and agglomerate into cake-like masses with rotation of the screw, resulting in not only unsmooth operation but also non-uniform contact with the alkaline material. So, it is also necessitated to pulverize again the obtained product for drying it.

In a preferred apparatus used in this invention, the clearance between the body wall and the ribbon is 1 to 10 times, preferably 2 to 5 times, the particle size of the polymer, while the width of the blade is 3 to 20 times, preferably 3 to 8 times, the polymer particle size. It is also desirable to design the blade such that the space ratio thereof $$\left( \text{which means} \frac{\text{blank area of blade} + \text{sectional area of shaft}}{\text{area of ribbon}} \times 100 \right)$$

is usually greater than 50%, preferably greater than 60%. As for the agitating conditions in this invention, the speed of the blade is usually from about 20 to 60 r.p.m., and the average residence time in the apparatus is 20 to 120 seconds in the case of continuous process.

In the agitating apparatus of this invention, the surface where the polymer particles are contacted with is made of or coated with a synthetic resin. The synthetic resin used for this purpose may be, for example, polyvinyl chloride, polystyrene, polypropylene, polyethylene, methacrylate resin, fluorocarbon resin, polycarbonate, polyethylene terephthalate, polybutylene terephthalate, epoxy resin, or unsaturated polyester resin. Most preferred among these resins is fluorocarbon resin. The apparatus may be entirely made of one of said synthetic resins, but in most cases, the area contacted with the polymer gel is covered with one of said synthetic resins by known means such as lining or coating. If such contacting area is not made of or coated with a synthetic resin such as above-mentioned, for example, if such area is made of stainless steel or glass-lined, the polymer particles adhere to such area to retard the smooth operation.

In the present invention, the hydrolysis of an acrylamide polymer can be accomplished by supplying the particles of a hydrous acrylamide polymer into mixing apparatus together with an alkaline material and mixing them under agitation usually at normal temperature. Such mixing operation can be practiced either batchwise or continuously. For instance, in case of using a screw conveyor having a ribbon flight or horizontal ribbon blender continuous process can be accomplished with ease.

In order to accomplish the hydrolysis to a desired degree in said apparatus, particularly when a high ratio of hydrolysis is desired, the residence time in the apparatus must be prolonged. This problem may be solved by elevating the temperature gradually with time in case of the batchwise process, or by elevating the temperature from the inlet side toward the outlet side in case of the continuous process, but these methods have a disadvantage that they are not easy to practice industrially. Therefore, there is usually employed a method in which only mixing with the alkaline material or mixing and a little degree of hydrolysis are performed in the mixing apparatus and the obtained mixture is immediately subjected to drying under heating so as to accomplish the hydrolysis to the desired degree during drying process.

Such drying can be accomplished under normal pressure or reduced pressure and at a temperature of not higher than 100° C., usually 40° to 100° C., by a known method, for example, by using a band dryer or a hot-air drying machine. According to the method of this invention, drying can be completed in a short time as the polymer gel is in a form of particle with size of less than 10 mm. Drying is performed until the polymer becomes to a pulverizable state (usually until the water content becomes less than 15%). Such drying may be practiced in two or more stages. Pulverization of the obtained dry polymer provides readily a desired partially hydrolyzed solid-state acrylamide polymer.

According to an industrially advantageous embodiment of this invention, the acrylamide polymer particles are extruded onto an end of a horizontal mixing apparatus having a ribbon blade or blades, such as for example a ribgon screw conveyor, and while these polymer particles are transferred to the other end of the mixing apparatus, an aqueous solution of an alkaline material is sprayed thereto. As the other end of the mixing apparatus is connected to a dryer, the polymer particles mixed with the alkaline material are successively introduced into the dryer and dried therein with hot air. The dried polymer particles are agglomerated, so that they are further powdered and prepared into commercial products.

While the method of this invention has been described in detail, it will be appreciated that the method of this invention has the following advantages:

(1) Hydrolysis can be accomplished without degrading the molecular weight and the quality of the acrylamide polymer.
(2) As the polymer particles are simply mixed with an alkaline material, the operation is very simple and also no agglomeration of the particles occurs.
(3) As the acrylamide polymer and alkaline material are uniformly contacted, the hydrolysis practiced won't be localized.
(4) As the obtained mixture or hydrolysis product is in a form of particle, it is easy to dry.
(5) As the hydrolysis of the desired degree can be accomplished during drying under heating, a short-time operation is realized.
(6) A continuous operation is possible.

Now, the present invention is described in further detail by way of some embodiments thereof, but it is to be understood that this invention is not limited to these embodiments but may be embodied in other ways without departing from the scope of the invention. In examples the viscosity of the polymer was measured as follows; Accurately weighed 1 gr of polymer was added to 199 gr of 4 wt% saline solution, and after dissolving the former in the latter under agitation for 4 hours, the viscosity of the solution was measured at 25° C. by a Brookfield viscometer, No. 2 rotor at 60 r.p.m.

EXAMPLE 1

Nitrogen gas was bubbled into a 25 wt% acrylamide aqueous solution to purge oxygen dissolved in said solution, and then 0.2 wt% (based on acrylamide) of 2,2-azobis(2-amidinopropane) hydrochloride was added as radical forming agent. The polymerization started at 20° C., and 5 hours later, there was obtained a hydrous rubber-like gel whose polymer had a viscosity of 125 cps. This hydrous rubber-like gel was crushed into the particles with size of 2.5 mm by a mincing machine with the screw diameter of 40 mm, length of 160 mm, pitch number of 4, outlet die opening of 2.4 mm and four rotary cutting edges positioned in front of said outlet die, said mincing machine being operated at speed of 80 r.p.m.

These particles were supplied continuously into a hot-air drier through a screw conveyor having a helical ribbon blade at the rate of 60 kg/hr along with a 20 wt% caustic soda solution fed at the rate of 21 kg/hr (a rate sufficient to hydrolyze 5 mol % of the amide groups in the polymer). The screw conveyor had a helical ribbon blade assembly such as shown in FIG. 2 and was operated at speed of 60 r.p.m. Other features of this screw conveyor were as follows: screw diameter = 140 mm; length = 2m; screw pitch = 140 mm; pitch number = 16; number of blades = 2; ribbon width = 10 mm; clearance between apparatus body wall and outer ribbon = 5 mm, space ratio = 65%. All the faces of the screw conveyor which may be contacted with the particles were made of stainless steel coated with fluorocarbon resin. The residence time on the screw conveyor was four hours, and during this period, the polymer particles and an alkaline material were mixed uniformly.

This mixture was dried by a hot-air dryer at 60° C. for 3 hours, whereby the amide groups in all the samples had been hydrolyzed by 4.9 mol %. The viscosity of the thus obtained partially hydrolyzed polymer was 145 cps.

COMPARATIVE EXAMPLE 1

The process of Example 1 was repeated but by using a screw conveyor with no coating of fluorocarbon resin. As a result, the rubber-like gel adhered on the stainless steel surface and adhered gel underwent an excess degree of hydrolysis by the continuously fed alkali. This badly impaired the uniformity of the hydrolysis ratio of the product.

COMPARATIVE EXAMPLE 2

1 kg of the polymer particles obtained in Example 1 and 35 gr of a 20% caustic soda solution (an amount sufficient to effect hydrolysis of 5 mol % of the amide groups) were supplied into a kneader-mixer. The particles began to agglomerate each other in a few minutes and were formed into rice cake-like masses in 10 minutes. The obtained cake-like product was cut by scissors and dried in the same way as Example 1. The amide groups had been hydrolyzed by 5.0 mol %, but the viscosity was 91 cps.

COMPARATIVE EXAMPLE 3

The particles of the hydrous rubber-like gel obtained in Example 1 were supplied at the rate of 10 kg/hr together with a 20% caustic soda solution fed at the rate of 350 g/hr (a rate sufficient to effect hydrolysis of 5 mol% of the amide groups) into the same mincing machine (die apperture 1.9 mm) as used in Example 1. Extrusion could be accomplished smoothly and there were obtained the particles with size of about 2 mm. These particles were dried in the same manner of Example 1. 4.9 mol % of the amine groups had been hydrolyzed, but the viscosity of the product was 109 cps and certain deterioration of the polymer was detected.

EXAMPLE 2

1 kg of the polymer particles obtained in Example 1 were supplied into an mixing trough having the helical ribbon blades such as shown in FIG. 3, while simultaneously feeding 94 gr of a 45% caustic soda solution (an amount sufficient to hydrolyze 30 mol % of the amide groups), and the mixture was agitated and mixed up for 5 minutes. The mixing was operated at speed of 30 r.p.m., and the direction of rotation was such that the particles would be pushed upwardly.

The other specifications of this mixing were as follows: screw diameter: 200 mm; screw pitch: 200 mm; pitch number: 1.5; number of blades: 2; ribbon width: 15 mm; trough height: 400 mm; clearance between blade and body: 5 mm, space ratio: 68%. All the faces contacted with the particles were coated with fluorocarbon resin.

In mixing, the particles didn't agglomerate and were contacted uniformly with alkali. When the resultant product was dried in the same way as Example 1, there was obtained a polymer where the amide groups had been hydrolyzed by 30 mol %.

COMPARATIVE EXAMPLE 4

The process of Example 2 was repeated but by using an agitation tank made of stainless steel with no fluorocarbon resin coating. It was found that the rubber-like gel covered the stainless steel surface, making it substantially impossible to accomplish mixing under agitation.

EXAMPLE 3

1 kg of the particles obtained in Example 1 and 141 gr of a 20% caustic soda solution necessary for hydrolyzing 20 mol % of amide groups were supplied into mixer having a gate type blade assembly such as shown in FIG. 4 and mixed under agitation for 5 minutes at speed of 120 r.p.m. Agitation and mixing could be accomplished smoothly. When the obtained mixture was dried in the same way as Example 1, there was obtained a modified product where 20% of the amide groups had been hydrolyzed.

The specifications of the above mixer were as follows: blade diameter: 140 mm, length: 600 mm, number of blades: 9, ribbon width: 10 mm, clearance between outer blade and mixer body: 5 mm, space ratio: 85%. All the blades were made of stainless steel coated with fluorine resin, and the body inner face was lined with a polybutylene terephthalate.

What is claimed is:

1. A method of partially and uniformly hydrolyzing acrylamide polymer in gel form having a water content of from 65 to 90 wt.% which comprises:
   (a) dividing said acrylamide polymer to particle size of less than 10 mm; and
   (b) subsequently admixing said finely divided acrylamide polymer with an alkaline material in a mixing apparatus wherein:
      (i) the surfaces in contact with said acrylamide polymer particles are formed of or coated with a synthetic resin;
      (ii) the mixing mechanism comprises blades or flights having a blank space;
      (iii) the clearance between the apparatus body wall and the blade is 2 to 5 times the polymer particle size;
      (iv) the width of blade is 3 to 8 times the polymer particle size; and
      (v) the space ratio of the blade $$(\frac{\text{blank area of the blade + sectional area of the shaft}}{\text{outer peripheral area of blade}} \times 100)$$

is greater than 5%, to hydrolyze a portion of the amide groups on said acrylamide polymer.

2. The method as set forth in claim 1, wherein the synthetic resin forming or coating the surface of the apparatus to be contacted with the polymer particles is fluorocarbon resin.

3. The method as set forth in claim 1, wherein the mixing mechanism is a double helical ribbon blade.

4. The method as set forth in claim 1, wherein the polymer particle size is within the range of 2 to 5 mm.

5. The method as set forth in claim 1, wherein the alkaline material is caustic soda.

6. The method as set forth in claim 1, wherein the mixing apparatus is of a horizontal type and so constructed that the polymer particles are transferred from one end thereof to the other and that an aqueous solution of an alkaline material is sprayed to the polymer particles during said transfer thereof.

7. The method as set forth in claim 1, wherein the obtained partially hydrolyzed polymer particles are dried under heating.

8. The method as set forth in claim 7, wherein drying under heating is accomplished under normal pressure or reduced pressure and at a temperature of 40° to 100° C.

* * * * *